(12) United States Patent
Hayashi et al.

(10) Patent No.: US 6,363,903 B1
(45) Date of Patent: Apr. 2, 2002

(54) INTAKE PORT STRUCTURE IN FOUR-STROKE CYCLE INTERNAL COMBUSTION ENGINE

(75) Inventors: Aruto Hayashi; Takeshi Fujimura; Seiji Mori, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,514

(22) Filed: Sep. 1, 2000

(30) Foreign Application Priority Data

Sep. 3, 1999 (JP) .......................................... 11-250860

(51) Int. Cl.[7] ............................. F02B 31/02; F01L 1/26; F01L 13/00; F02D 13/02; F02M 69/00
(52) U.S. Cl. ..................................... 123/193.5; 123/308
(58) Field of Search ............................. 123/193.5, 302, 123/308

(56) References Cited

U.S. PATENT DOCUMENTS 4,520,775 A * 6/1985 Nakamura ................... 123/308
5,549,088 A * 8/1996 Isaka ........................... 123/308
5,655,498 A * 8/1997 Suzuki et al. ................ 123/308

FOREIGN PATENT DOCUMENTS

| JP | 59-33852 | 9/1984 |
| JP | 6-272561 | 9/1994 |

* cited by examiner

*Primary Examiner*—Marguerite McMahon
(74) *Attorney, Agent, or Firm*—Arent Fox Kintner Plotkin & Kahn, PLLC

(57) ABSTRACT

A common intake port 10 is branched into a pair of branch intake ports 12, 24, which are separated through a partition wall 11, at the downstream end thereof. A pair of intake valves 16, 17 adapted to independently open and close the pair of branch intake ports 12, 14, respectively, are provided. In a four-stroke cycle internal combustion engine 1 adapted so that one 16 of the pair of intake valves 16, 17 opens and closes in a low intake air operating range, while the other intake valve 17 is in a resting condition, and that both the pair of intake valves 16, 17 open and close in a high intake air operating range, a cutout 57 is formed in a laterally central portion of the partition wall 11 in such a way as to extend from the edge of the upstream end of the partition wall 11 toward the downstream end thereof and to separate the pair of branch intake ports 12, 14 from each other.

7 Claims, 15 Drawing Sheets

INTAKE PORT STRUCTURE IN FOUR-STROKE CYCLE INTERNAL COMBUSTION ENGINE

BACKGROUND OF THE INVENTION

1. Field of the Invention

The present invention relates to an intake port for smoothly performing combustion over the entire operating range in a four-stroke cycle internal combustion engine in which one of a pair of intake valves is in a resting condition (incidentally, in the present specification, even when the lift amount of the intake valve is minute and the intake of a slight amount of air or air-fuel mixture is performed, the intake valve is referred to as "being in a resting condition"), for suppressing the emission of air pollutants, which are contained in exhaust gases, therefrom as much as possible, and for obtaining high output and efficiency.

2. Description of the Related Art

As the technique for enhancing thermal efficiency to reduce combustion emissions in a four-cycle internal combustion engine, there has been developed a method of causing a horizontal swirl whirling about the central line or axis of a cylinder in intake air or air-fuel mixture flowing to a combustion chamber in the cylinder in the range of a low intake air operation, such as a low load operation or a low speed operation, thereby improving the combustion condition.

Hitherto, as means for generating a swirl, there has been developed a device for enhancing the directivity of an intake airflow in the combustion chamber in the low intake air operating range during the resting condition of the intake valve by extremely largely bending an intake-valve normally-operating side branch port, of which intake valves continuously open and close, between a pair of branch intake ports each having a couple of intake valves.

Further, as other means for generating a swirl, there have been developed devices for letting intake air, which flows through the intake-valve resting side branch port, flow into the intake-valve normally-operating side branch port through the communication hole from a side thereof in a low intake air operating range during the resting condition of the intake valve by providing a communication hole in a partition wall between a pair of an intake-valve normally-operating side branch port and an intake-valve resting side branch port, thereby enhancing a swirl (see JP-B-59-33852U and JP-A-6-272561 official gazettes).

Although a swirl is enhanced by increasing the curvature of the intake-valve normally-operating side branch port or decreasing the transversal sectional area thereof so as to improve the combustion condition and reduce fuel consumption, the intake resistance increases in a high intake air operating range in which both the intake valves are opened and closed. Thus, the conventional devices have drawbacks in that the intake flow coefficient is degraded, that the maximum output of the engine in the high intake air operating condition decreases, and that the fuel consumption thereof is deteriorated.

SUMMARY OF THE INVENTION

The object of the present invention is to provide an intake port for smoothly performing combustion over the entire operating range in a four-stroke cycle internal combustion engine while eliminating such drawbacks.

According to the present invention, there is provided a first intake port structure in a four-stroke cycle internal combustion engine. In this engine, a common intake port is branched into a pair of branch intake ports, which are separated through a partition wall, at the downstream end thereof. Further, a pair of intake valves adapted to independently and respectively open and close the pair of branch intake ports are provided therein. Moreover, one of the pair of intake valves opens and closes in a low intake air operating range, while the other intake valve is in a resting condition. Furthermore, both the pair of intake valves open and close in a high intake air operating range. The intake port structure comprises a cutout formed in the laterally central portion of the partition wall in such a way as to extend from an edge of the upstream end of the partition wall toward the downstream end thereof and to separate the pair of branch intake ports from each other.

In the case of this intake port structure, the cutout is formed extending from the edge of the upstream end of a partition wall is formed in a laterally central portion of the partition wall that separates the pair of branch intake ports, as described above. Therefore, in a high intake air operating range in which both the intake valves open and close, no intake airflow is largely disturbed by this cutout. Moreover, the sectional area of each of the branch intake ports is not reduced. This enables increase in the maximum output and improvement of fuel efficiency. Furthermore, in a low intake air operating range in which one of the intake valves is in a resting condition, intake air having flown into the intake-valve resting side branch intake port flows into a normally-operating side branch intake port through the cutout without flowing backward to the upstream common intake port. Thus, this intake air joins intake air contained in the normally-operating side branch intake port. This enhances a swirl of intake air flowing into a combustion chamber from the normally-operating side branch intake port. Consequently, the concentration of air-fuel mixture in the intake air is uniformed in the low intake air operating condition, such as the low load operating condition or the low speed operating condition. Moreover, the generation of $NO_x$ gas and unburnt gas is suppressed. Furthermore, lean combustibility is enhanced. Consequently, the improvement of fuel efficiency is enabled.

Further, apart of the partition wall is removed by forming the cutout, so that the area of the surface of the partition wall decreases. Thus, the deposition of fuel on the wall surface increases. Consequently, the startability of the internal combustion engine is enhanced. Moreover, the properties of exhaust gas are improved.

Furthermore, according to the intake port structure of the present invention, the downstream end surface of the cutout formed in the partition wall is inclined in a direction in which the downstream end surface thereof approaches an opening of one of the intake valves that continuously open and close. Therefore, even in any intake air operating condition, especially, in a low intake air operating condition, intake air having flown through the cutout portion to the downstream end thereof smoothly flows into the normally-operating side branch port. Thus, a swirl is enhanced still more without reducing the intake flow coefficient. Consequently, the effects of the first intake port structure are significantly enhanced.

Further, according to the intake port structure of the present invention, the groove portion extending from the upstream side of the intake-valve resting side branch intake port to the downstream side of the intake-valve normally-operating side branch port is formed in a curved inner surface portion of the pair of branch intake ports at the intake valve-opening-side of the cutout provided in the partition wall. Therefore, in a low intake air operating condition, intake air flowing through the intake-valve resting side branch intake port into the groove in the cutout can be led to the vicinity of an intake opening of the intake-valve normally-operating side branch intake port. Thus, a swirl can be enhanced still more. The generation of $NO_x$ gas can be suppressed still more, and the lean combustibility can be improved still more.

Furthermore, according to the intake port structure of the present invention, the bottom surface of the groove portion smoothly connects with the bottom surface of the intake-valve resting side branch intake port and the downstream bottom surface of the intake-valve normally-operating side branch intake port. Thus, in a low intake air operating condition, intake air flowing from the intake-valve resting side branch intake port can be made to smoothly flow through the groove of the cutout to the intake-valve normally-operating side branch intake port. Consequently, the effects of the third intake port structure can be enhanced still more.

Additionally, according to the intake port structure of the present invention, the transverse sectional area of the intake-valve normally-operating side branch intake port is set in such a manner as to be smaller than the transverse sectional area of the intake-valve resting side branch intake port. Therefore, in a low intake air operating condition, a swirl can be enhanced still more by increasing the flow velocity of intake air flowing through the intake-valve normally-operating side branch intake port. Thus, the generation of $NO_x$ gas and unburnt gas is suppressed still more. Consequently, the fuel efficiency is improved still more.

Further, according to the intake port structure of the present invention, each of the side surface of the partition wall and the side surface of the intake-valve normally-operating side branch intake port, which faces the side surface of the partition wall, is set in such a manner as to be narrower than the width between the other side surface of the partition wall and the side surface of the intake-valve resting side branch intake port, which surface faces the latter side surface of the partition wall. Thus, the effects of the fifth embodiment can be enhanced still more.

DETAILED DESCRIPTION OF THE PREFERRED EMBODIMENTS

Figure 1:
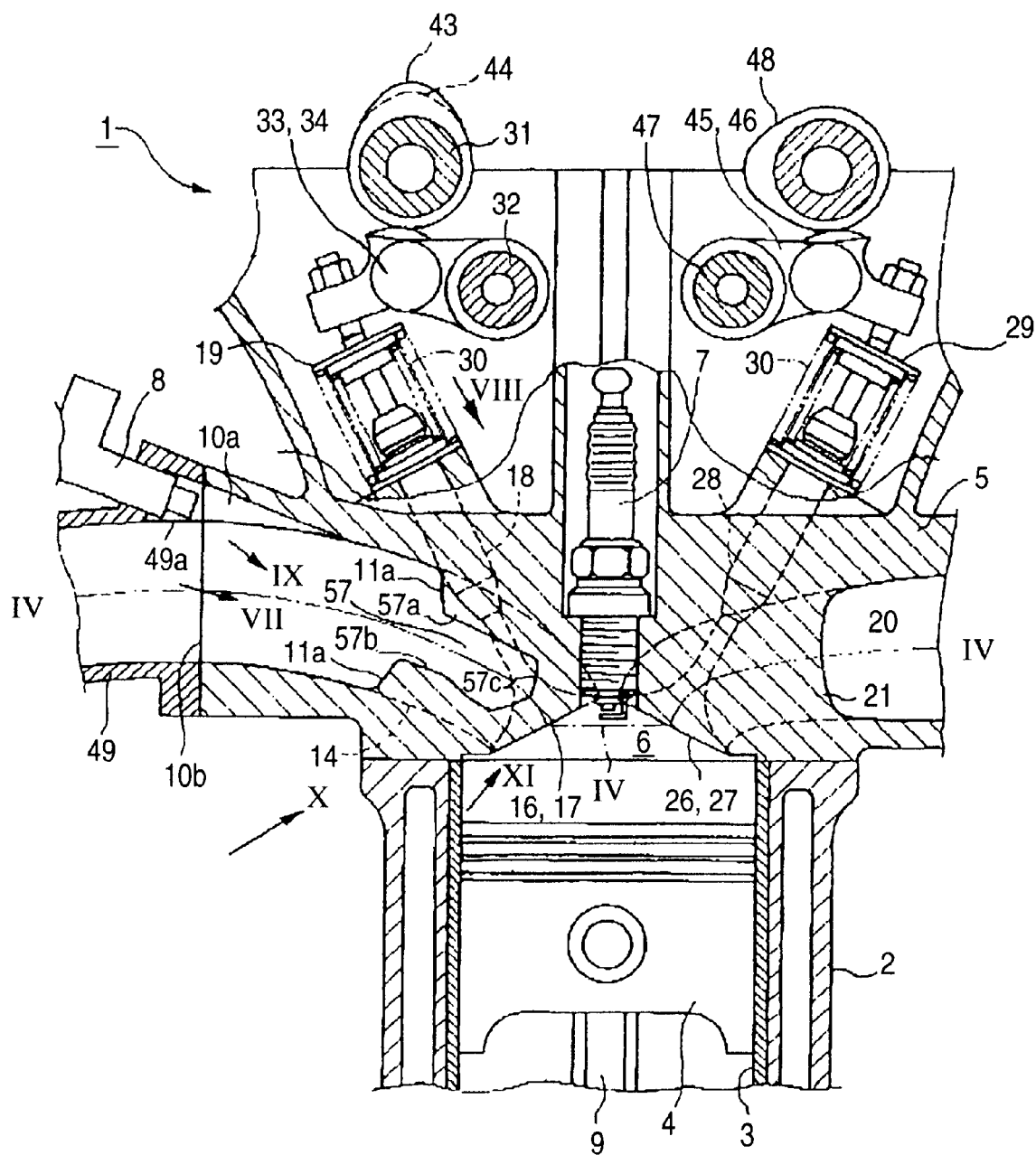
FIG. 1 is a longitudinal sectional side view of a spark ignition four-stroke cycle internal combustion engine that is a first embodiment of the present invention.

Hereinafter, a description will be given of a first embodiment of intake port structures with reference to FIGS. 1 to 11.

A spark ignition four-stroke cycle internal combustion engine 1 is mounted on a car (not shown). A piston 4 is slidably fitted into a cylinder 3 of a cylinder block 2 in the spark ignition four-stroke cycle internal combustion engine 1. A combustion chamber 6 is defined between a cylinder head 5 which is connected to the top end of the cylinder block 2, and the cylinder 3. A spark plug 7 is attached to the cylinder head 5 in such a manner as to face the combustion chamber 6. The piston 4 is connected to a crankshaft (not shown) through a connecting rod 9.

Further, a single common intake port 10 is formed in the cylinder head 5. The common intake port 10 is branched into a pair of an intake-valve normally-operating side branch intake port 12 and an intake-valve resting side branch intake port 14, which are laterally arranged and separated through the partition wall 11 at the downstream end thereof. An intake-valve normally-operating side opening 13 and an intake-valve resting side opening 15 are respectively provided in the intake-valve normally-operating side branch intake port 12 and the intake-valve resting side branch intake port 14, which face the combustion chamber 6. Further, a normally-operating side intake valve 16 and a resting side intake valve 17, which are used for respectively opening and closing the intake-valve normally-operating side opening 13 and the intake-valve resting side opening 15, are slidably fitted in a guide sleeve 18. A valve spring 30 is interposed between a retainer 19, which is provided on the top end of each of the normally-operating side intake valve 16 and the resting side intake valve 17, and the top end of the guide sleeve 19. The normally-operating side intake valve 16 and the resting side intake valve 17 are adapted to be normally closed by a resilient force of the valve spring 30.

Furthermore, a common exhaust port 20 is formed in the cylinder head 5 in such a way as to be opposed to the common intake port 10. This common exhaust port 20 is branched into a pair of exhaust ports 22 and 24, which are laterally arranged at the upstream end thereof and separated through a partition wall 21. Exhaust openings 23 and 25 are respectively provided in the exhaust ports 22 and 24 that face the combustion chamber 6. Exhaust valves 26 and 27 respectively used for opening and closing the exhaust openings 23 and 25 are slidably fitted in a guide sleeve 28. A valve spring 30 is interposed between a retainer 29, which is provided on the top end of each of the exhaust valves 26 and 72, and the top end of the guide sleeve 28. The exhaust valves 26 and 27 are adapted to be normally closed by a resilient force of the valve spring 30.

Moreover, a cam shaft 31 is pivotally supported by the cylinder head 5 through a valve gear transmission mechanism (not shown) in parallel to the crankshaft (not shown) in such a way as to be able to rotate at a rotational speed, which is half the rotating speed of the crankshaft. A rocker shaft 32 is disposed in parallel to the cam shaft 31. A normally-operating side rocker arm 33 and a resting side rocker arm 34 are slidably fitted into the rocker shaft 32. A switchover mechanism 35 is interposed between the normally-operating side rocker arm 33 and the resting side rocker arm 34.

Thus, in the switchover mechanism 35, a cylinder chamber 36 is formed in the normally-operating side rocker arm 33 in parallel to the rocker shaft 32. Moreover, a stepped cylinder chamber 37 is formed in the resting side rocker arm 34 in such a way as to be placed on the same axis as the cylinder chamber 36. A piston 38 and a stepped piston 39 are slidably fitted into the cylinder chamber 36 and the stepped cylinder chamber 37, respectively. A return spring 40 is interposed between a step portion 37a of the stepped cylinder chamber 37 and a head portion 39a of the stepped piston 39. The cylinder chamber 36 is communicated with a hydraulic source through a valve timing switchover oil passage 41 of the normally-operating side rocker arm 33, a valve timing switchover oil passage 42 of the rocker shaft 32, and a hydraulic switching valve (not shown). In a state in which no pressure oil is supplied from the hydraulic source to the cylinder chamber 36, the piston 38 retreats into the cylinder chamber 36, the abutting contact end surface between the piston 38 and the stepped piston 39 is placed between the normally-operating side rocker arm 33 and the resting side rocker arm 34, so that the normally-operating side rocker arm 33 is disconnected from the resting side rocker arm 34. Thus, pressure oil is supplied from the source to the cylinder chamber 36. Conversely, in a state in which pressure oil is supplied from the hydraulic source to the cylinder chamber 36, the piston 38 projects into the stepped cylinder chamber 37, so that the normally-operating rocker arm 33 and the resting side rocker arm 34 are connected in such a manner as to be integral with each other.

Further, in the camshaft 31, a normally-operating side high lift cam lobe 43 and an extremely low lift resting side cam lobe 44 are formed. The normally-operating side cam lobe 43 and the resting side cam lobe 44 come into contact with slippers of the normally-operating side rocker arm 33 and the resting side rocker arm 34, respectively. The normally-operating side intake valve 16 and the resting side intake valve 17 are opened and closed by the normally-operating side cam lobe 43 and the resting side cam lobe 44 according to lift amount characteristics illustrated in FIG. 6 in a state in which the normally-operating side rocker arm 33 and the resting side rocker arm 34 are disconnected from each other.

Moreover, in the valve gear transmission mechanism for the exhaust valves 26 and 27, rocker arms 45 and 46 respectively brought into contact with the top ends of the exhaust valves 26 and 27 are slidably fitted into a rocker shaft 47. A pair of cam lobes 48, 48 respectively coming into contact with the slippers of the rocker arms 45 and 46 is formed in such a way as to have identical shape. Each of the rocker arms 45 and 46 has no intake system switchover mechanism 35. The exhaust valves 26 and 27 are opened and closed according to the same cam lift characteristics.

Furthermore, an intake manifold 49 communicating with the common intake port 10 is mounted at the intake side of the cylinder head 5. Recess portions 10a and 49a are formed on the top part of the connecting portion between the common intake port 10 and the intake manifold 49 in such a manner as to upwardly extend to a fuel injection valve 8 that is fitted into the recess portion 49a of the intake manifold 49. Fuel is injected from the fuel injection valve 8 to the intake-valve normally-operating side branch intake port 12 and the intake-valve resting side branch intake port 14 through the common intake port 10.

Figure 2:
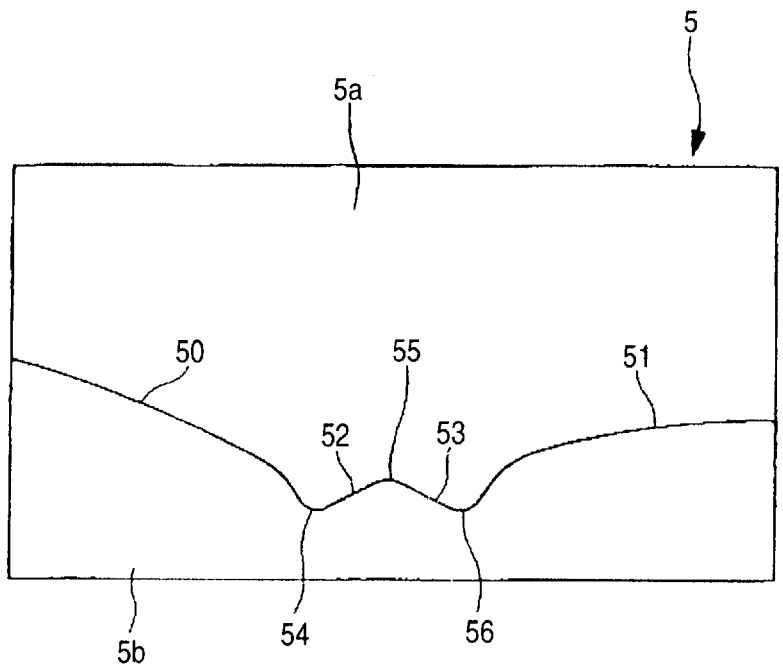
FIG. 2 is a schematic side view of a cylinder head.

Next, a description will be given in detail of the three-dimensional shapes of the common intake port 10, the intake-valve normally-operating side port 12, and the intake-valve resting side port 14. Therefore, as illustrated in FIG. 2, a laterally horizontal division curved surface 50, which passes through the center lines of the common intake port 10, the intake-valve normally-operating side branch intake port 12, and the intake-valve resting side branch intake port 14, a laterally horizontal division curved surface 51, which passes through the central lines of the common exhaust port 20, the exhaust port 22 and the exhaust port 24, a division plane 52, which passes through radial parts of the intake-valve normally-operating side opening 13 and the intake-valve resting side opening 15 that are placed to the spark plug 7, and a division plane 53, which passes through radial parts of the exhaust opening 23 and the exhaust opening 25 that are placed to the spark plug 7, are connected with smooth connection curved surfaces 54, 55, and 56. Then, by vertically dividing the cylinder head 5 by the division curved surfaces 50, 51, division surfaces 52, 53 and the connection curved surfaces 54, 55, and 56, there are illustrated the shapes of divided parts of a cylinder-head upper half portion 5a and a cylinder-head lower half portion 5b as shown in FIGS. 8 to 11.

Figure 7:
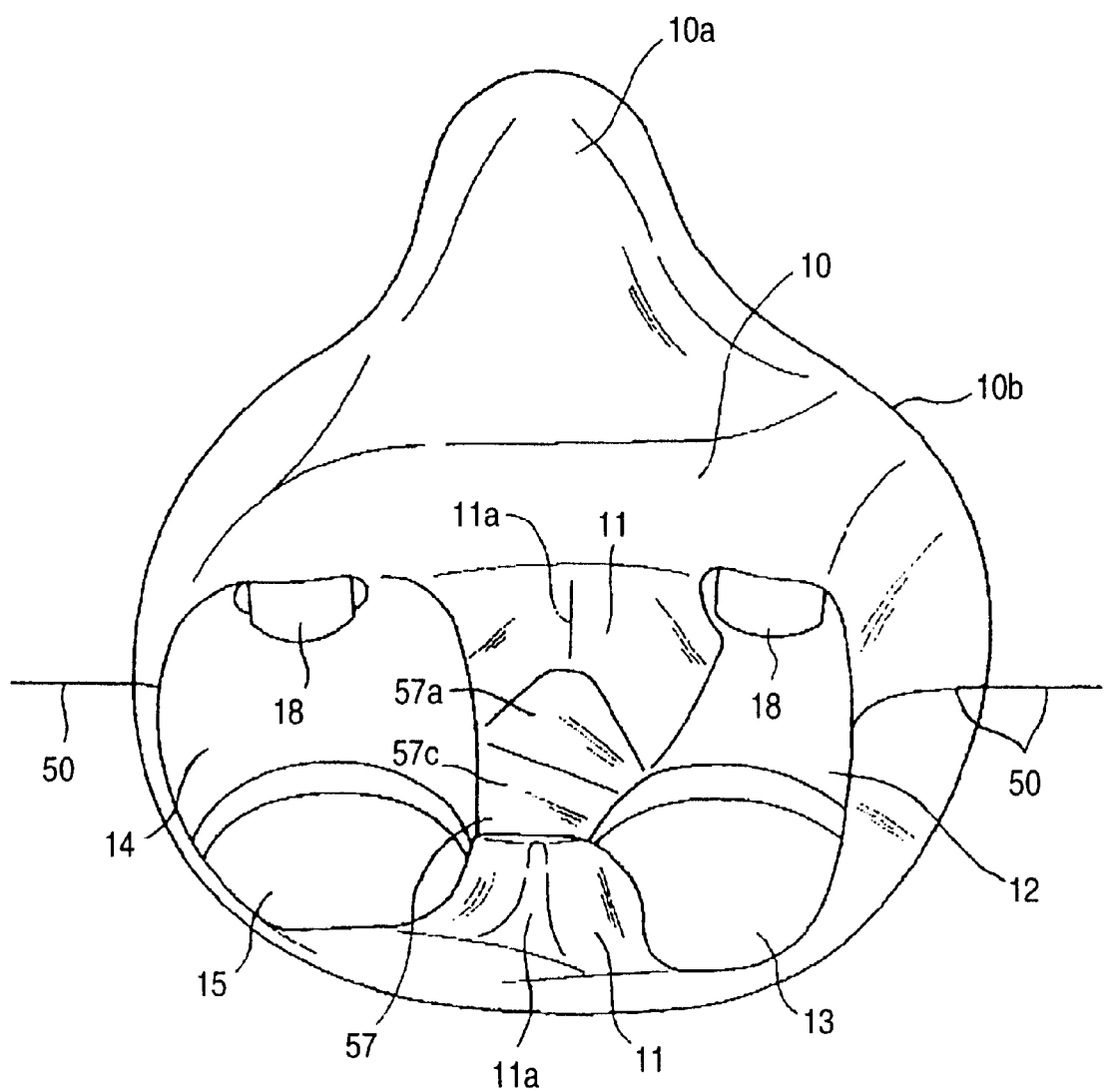
FIG. 7 is a perspective view taken from the direction of an arrow VII of FIG. 1.
Figure 8:
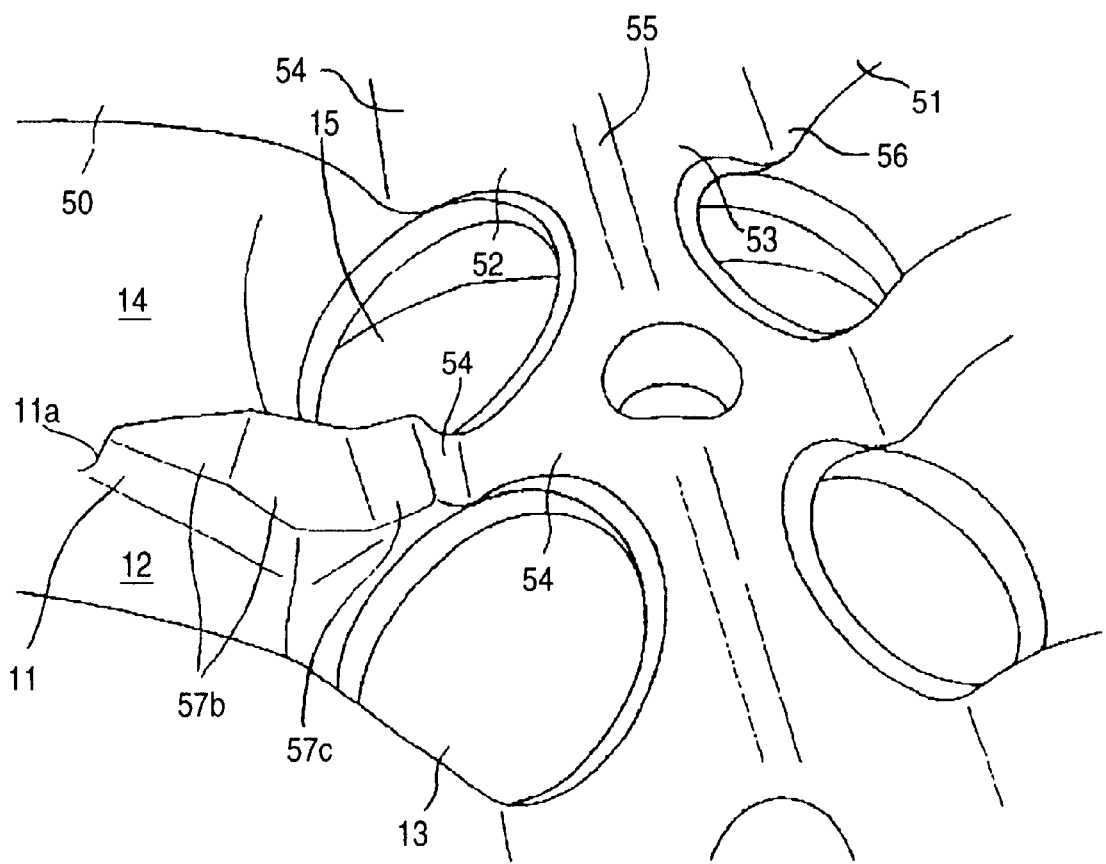
FIG. 8 is a perspective view of a lower half portion of the cylinder head divided as illustrated in FIG. 2, which is taken from the direction of an arrow VIII of FIG. 1.
Figure 9:
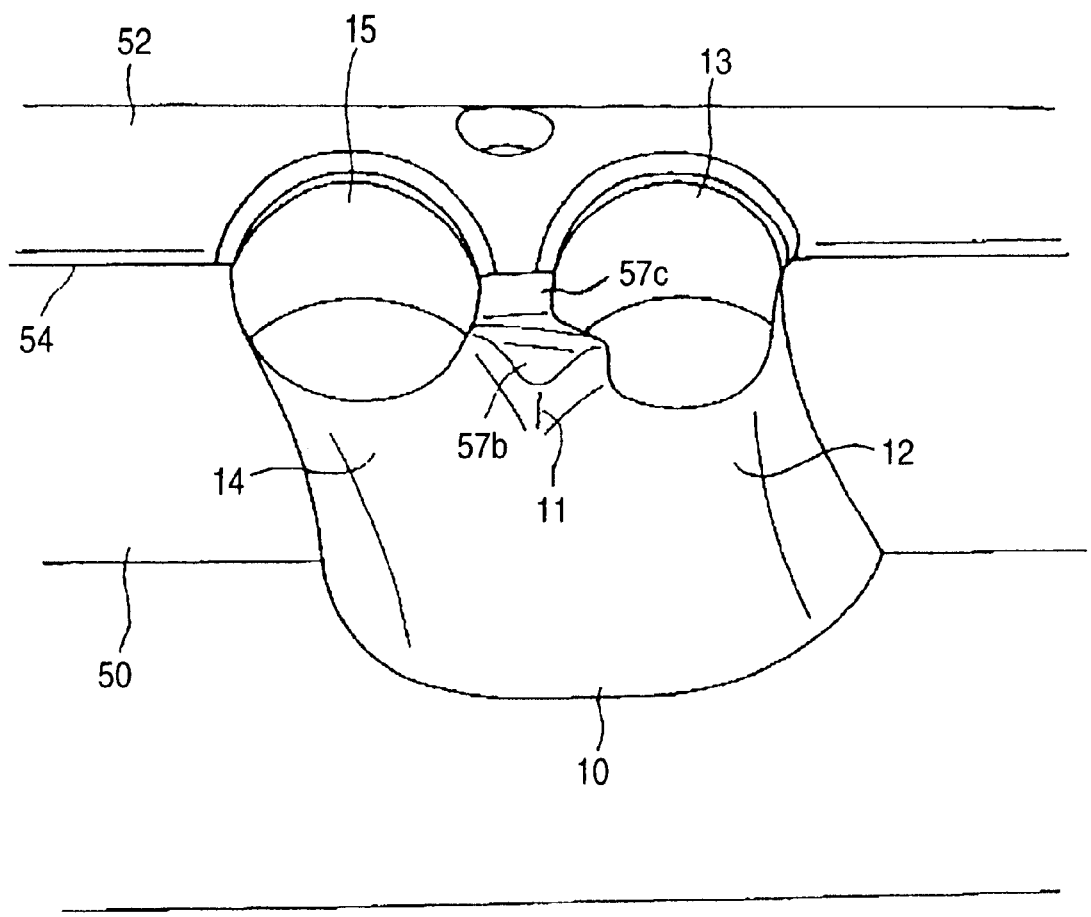
FIG. 9 is a perspective view of the lower half portion of the cylinder head divided as illustrated in FIG. 2, which is taken from the direction of an arrow IX of FIG. 1.
Figure 10:
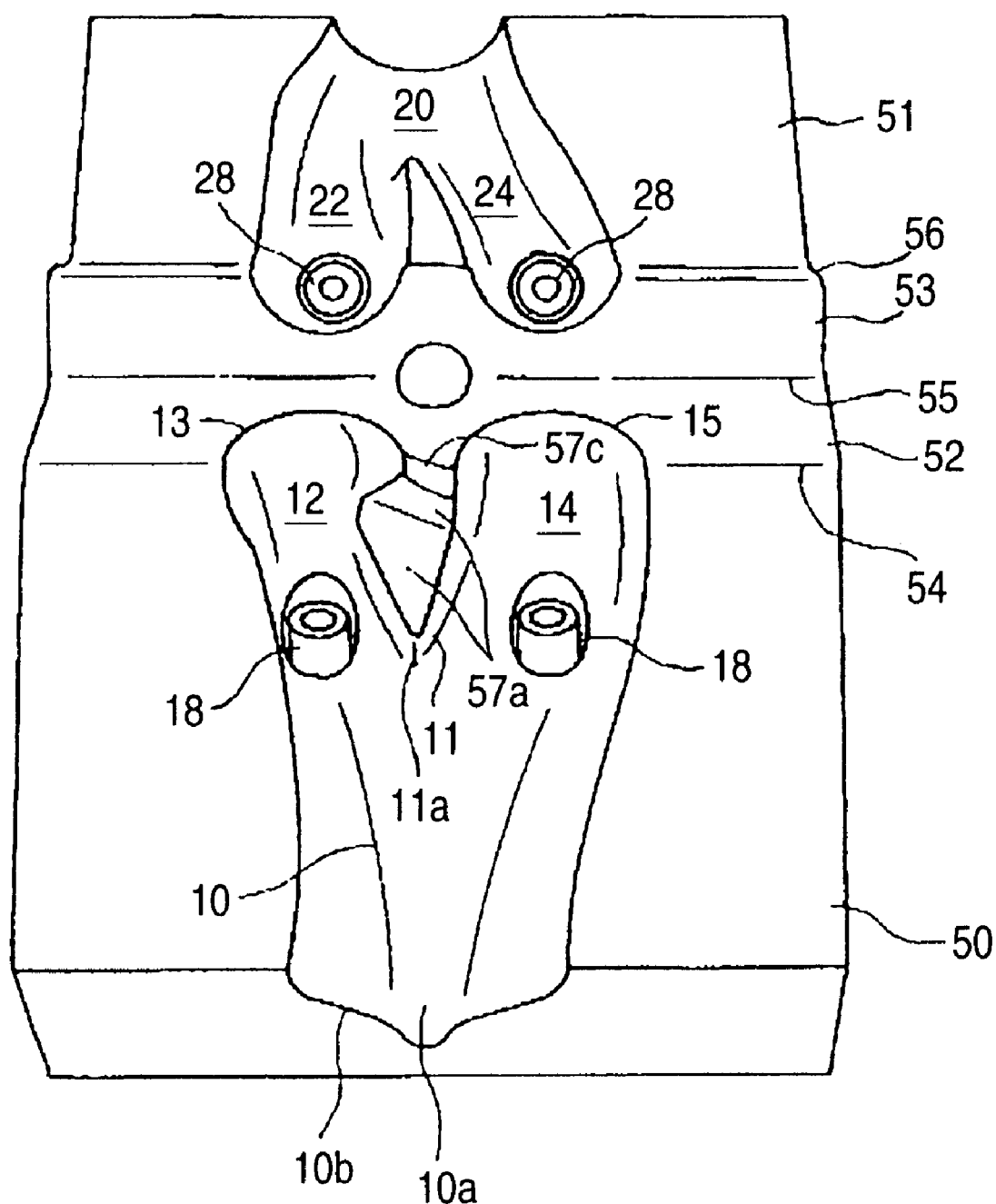
FIG. 10 is a perspective view of the lower half portion of the cylinder head divided as illustrated in FIG. 2, which is taken from the direction of an arrow X of FIG. 1.
Figure 11:
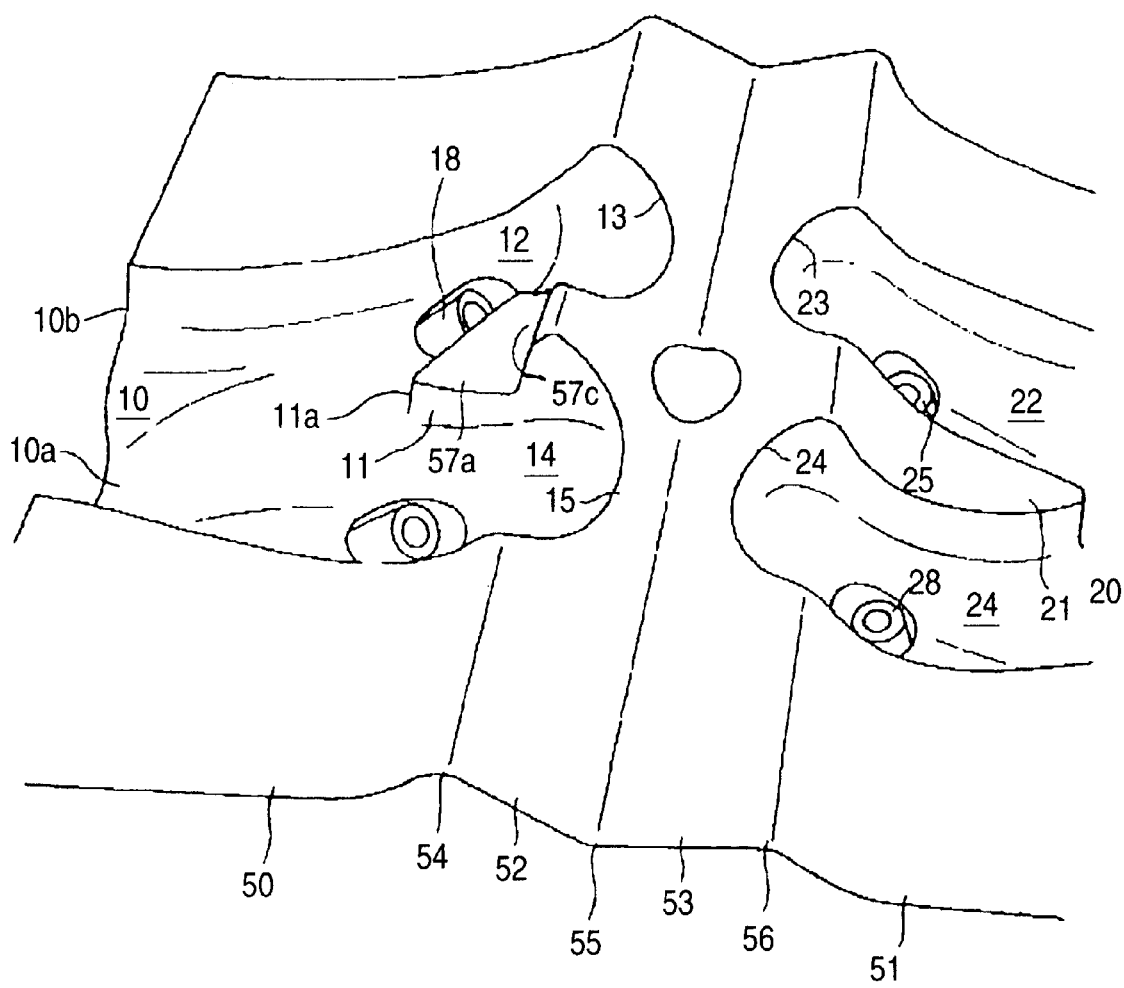
FIG. 11 is a perspective view of the lower half portion of the cylinder head divided as illustrated in FIG. 2, which is taken from the direction of an arrow XI of FIG. 1.
Figure 12:
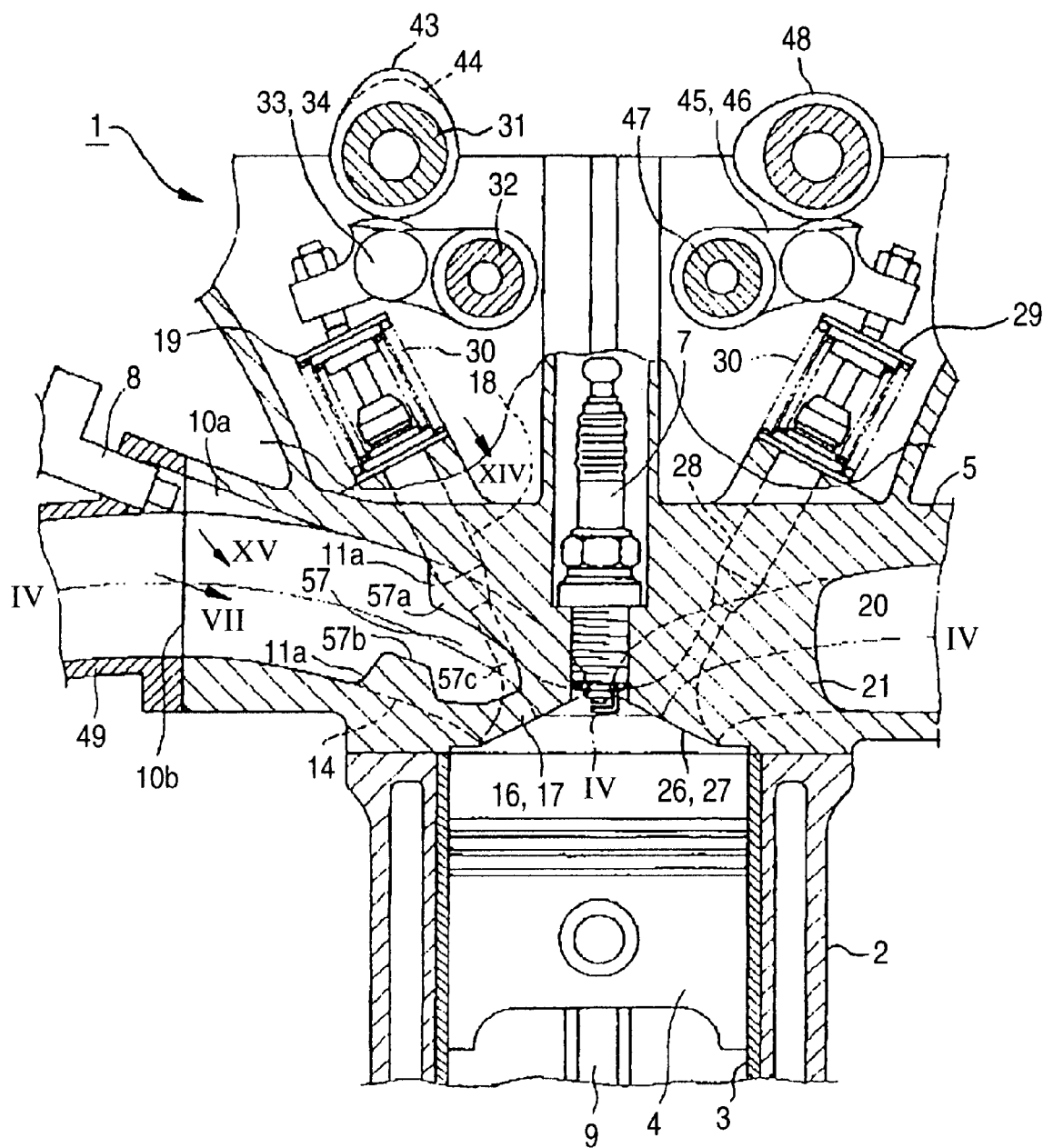
FIG. 12 is a longitudinal sectional side view of a spark ignition four-stroke cycle internal combustion engine that is a second embodiment of the present invention.
Figure 13:
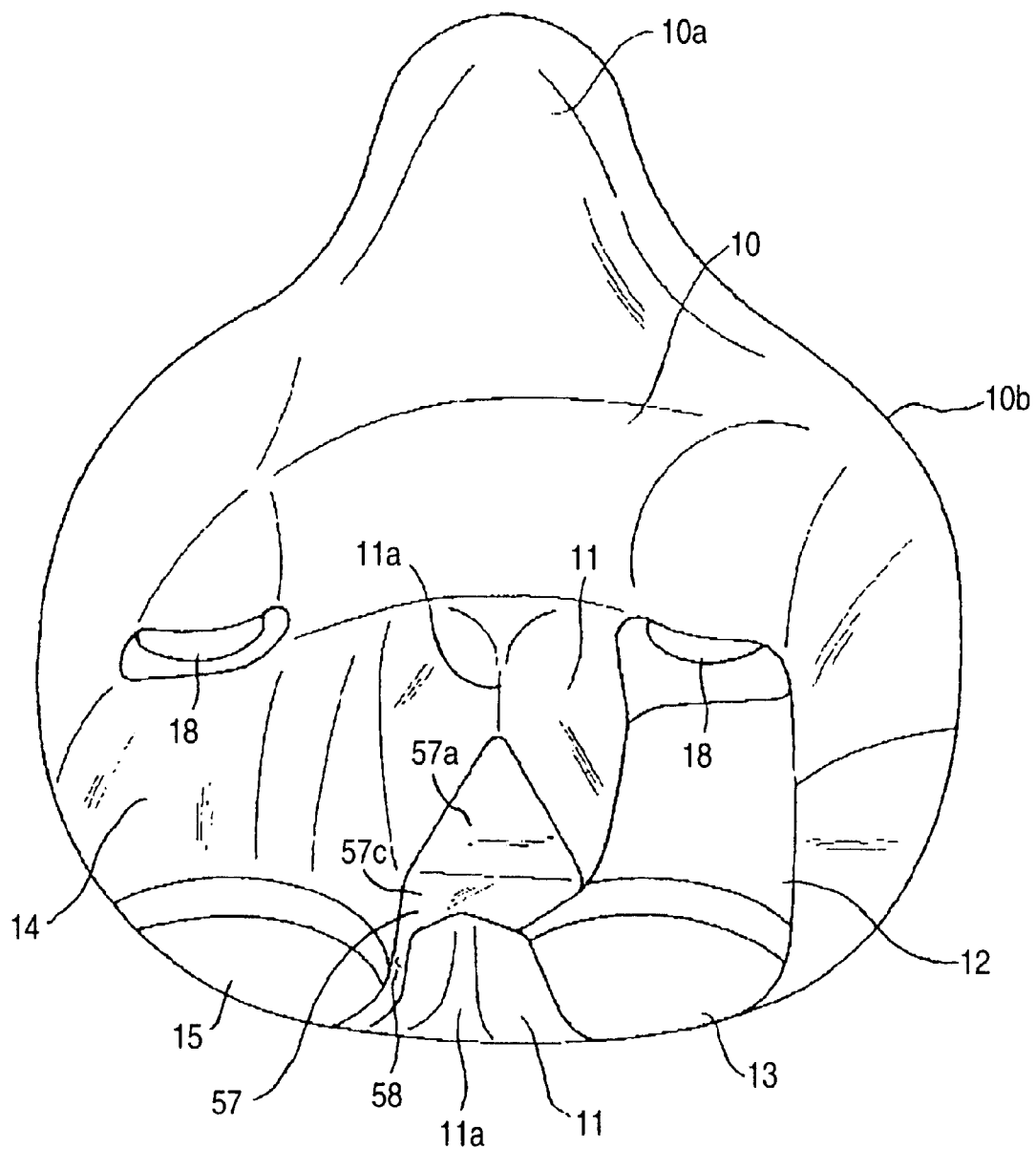
FIG. 13 is a perspective view taken from the direction of an arrow XIII of FIG. 12.
Figure 14:
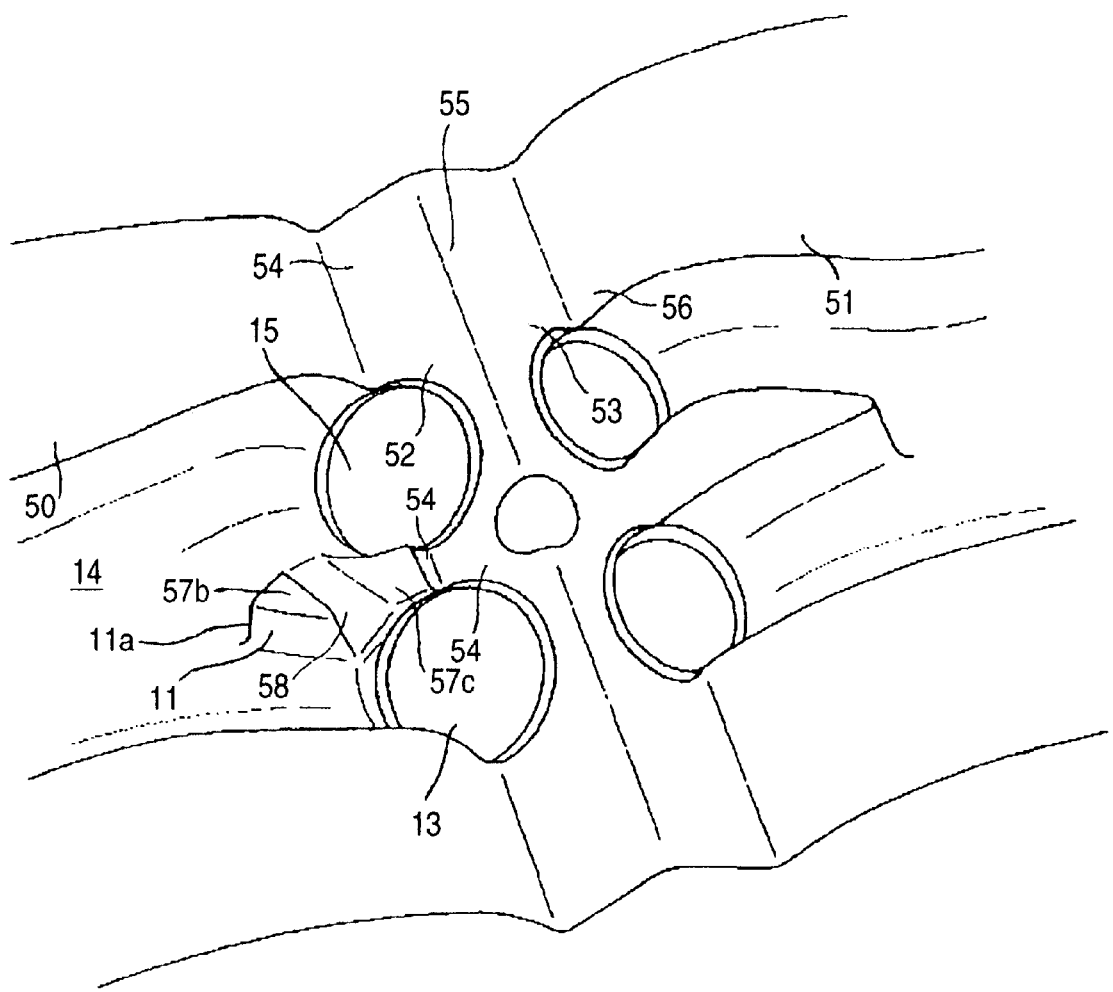
FIG. 14 is a perspective view of the lower half portion of the cylinder head divided as illustrated in FIG. 2, which is taken from the direction of an arrow XIV of FIG. 12.
Figure 15:
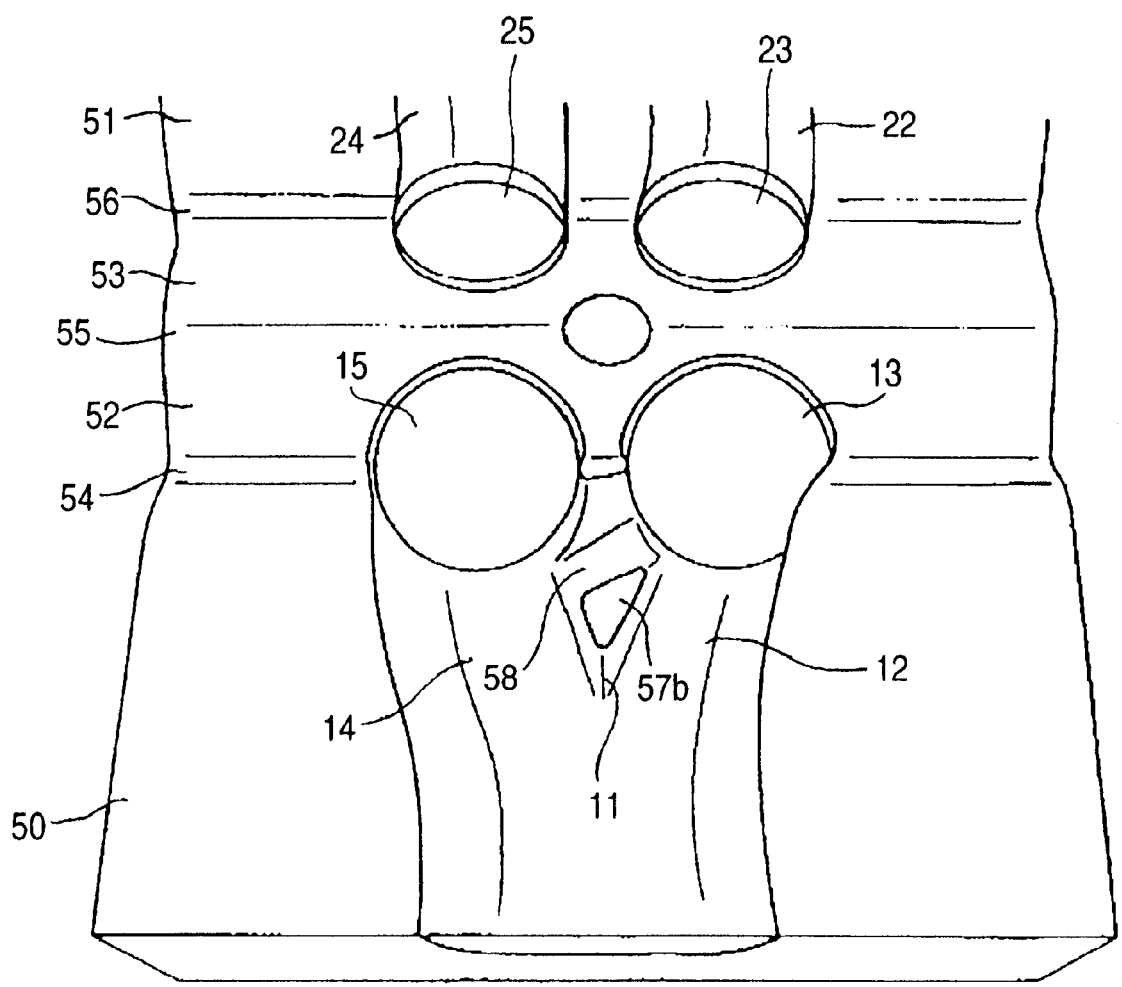
FIG. 15 is a perspective view of the lower half portion of the cylinder head divided as illustrated in FIG. 2, which is taken from the direction of an arrow XV of FIG. 12.

FIG. 7 is a perspective view of an upstream end opening 10b of the common intake port 10, which is taken from the direction of an arrow VII of FIG. 1. The width of the common intake port 10 tapers off toward the intake-valve normally-operating side opening 13 and the intake-valve resting side opening 15 (incidentally, although the degree of tapering is low, the degree of tapering may be increased still more) and smoothly connects with the upstream side of each of the intake-valve normally-operating side intake port 12 and the intake-valve resting side intake port 14. Further, a cutout 57 having a U-shaped section, as viewed from a side thereof (see FIG. 1), is formed in a vertically central portion of the partition wall 11 laterally separating the intake-valve normally-operating side branch intake port 12 and the intake-valve resting side branch intake port 14 in such a manner as to extend from the upstream edge 11a of the partition wall 11 toward the intake-valve normally-operating side opening 13 and the intake-valve resting side opening 15.

The upper surface 57a of the cutout 57 is downwardly inclined in such a way as to extend from the intake-valve resting side branch intake port 14 to the proximity of the intake-valve normally-operating side opening 13. The lower surface 57b of the cutout 57 is downwardly inclined, as viewed in FIGS. 8 and 9 respectively taken from the directions of arrows VIII and IX of FIG. 1, in such a manner as to extend from the intake-valve resting side branch intake port 14 to the proximity of the intake-valve normally-operating side opening 13, similarly as the upper surface 57a of the cutout 57. The downstream end surface 57c of the cutout 57 is downstream inclined, as viewed in FIGS. 10 and 11 respectively taken from the directions of arrows X and XI of FIG. 1 and viewed in FIG. 4, in such a manner as to extend from the upstream side of the intake-valve resting side branch intake port 14 toward the downstream side of the intake-valve normally-operating side branch intake port 12 and to approach the proximity of the intake-valve normally-operating side opening 13. Intake air flow having run through the intake-valve resting side branch intake port 14 is twisted clockwise by the upper surface 57a and the lower surface 57b of the cutout 57 and led to the intake-valve normally-operating side opening 13 by the downstream end 57c of the cutout 57.

Further, the intake-valve normally-operating side branch intake port 12 is formed in such a manner as to be thinner than the intake-valve resting side branch intake port 14 so that the transverse sectional area of the intake-valve normally-operating side branch intake port 12 is smaller than the transverse sectional area of the intake-valve resting side branch intake port 14. Moreover, the intake-valve normally-operating side branch intake port 12 and the intake-valve resting side branch intake port 14 are formed so that the lateral width of the intake-valve normally-operating side branch intake port 12 is less than the lateral width of the intake-valve resting side branch intake port 14.

Figure 5:
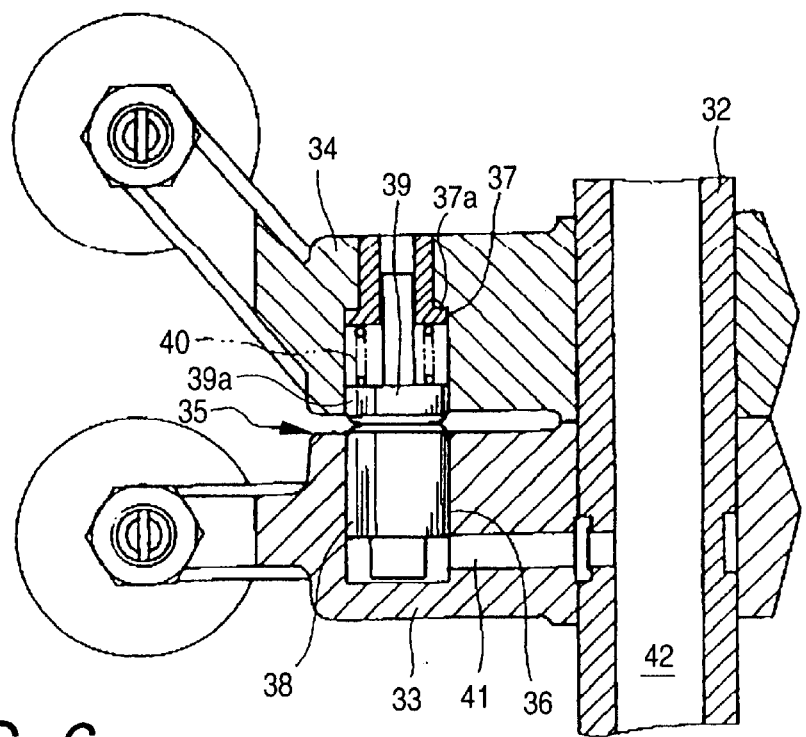
FIG. 5 is a longitudinal plan view of a rocker shaft, a normally-operating side rocker arm, and a resting side rocker arm.
Figure 6:
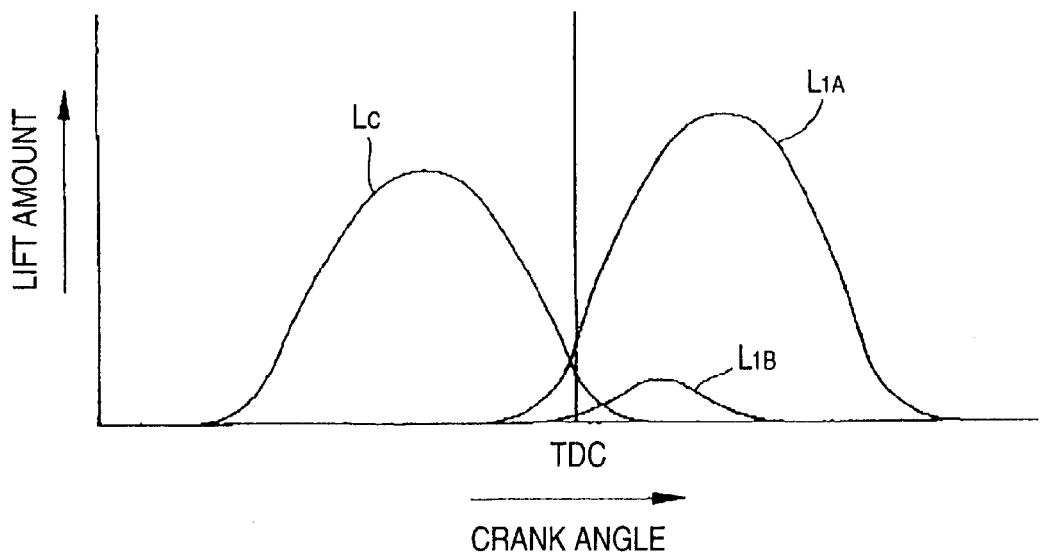
FIG. 6 is a graph showing lift characteristics of a normally-operating side intake valve, a resting side intake valve, and an exhaust valve.

The embodiment illustrated in FIGS. 1 to 11 is configured as described above. Thus, in an intake stroke in which the spark ignition four-stroke cycle internal combustion engine 1 starts operating so that the piston 4 descends and the normally-operating side intake valve 16 and the resting side intake valve 17 open, intake air flows into the common intake port 10 from the intake manifold 49. Then, the intake air is split into the intake-valve normally-operating side branch intake port 12 and the intake-valve resting side branch intake port 14. Subsequently, the intake air is drawn into the combustion chamber 6 from the intake-valve normally-operating side opening 13 and the intake-valve resting side opening 15. Simultaneously, fuel is sprayed from the fuel injection valve into the common intake port 10. In the range of a low intake air operation, such as a low load operation or a low speed operation, the supply of pressure oil into the cylinder chamber 36 through the valve timing switchover oil passages 42, 41 is stopped, and the piston 38 retreats into the cylinder chamber 36, as illustrated in FIG. 5. The normally-operating side rocker arm 33 and the resting side rocker arm 34 vertically swing in such away as to cause a large difference in lift amount between the normally-operating side cam lobe 43 (lift property: $L_{1A}$) and the resting side cam lobe 44 (lift property: $L_{1B}$). Thus, the resting side intake valve 17 is not wide open. Consequently, most of the intake air drawn into the common intake port 10 flows into the combustion chamber 6 from the normally-operating side intake valve 16. The amount of intake air flowing into the combustion chamber 6 from the resting side intake valve 17 through the intake-valve resting side opening 15 is slight so that fuel does not stay in the intake-valve resting side branch intake port 14.

Figure 3:
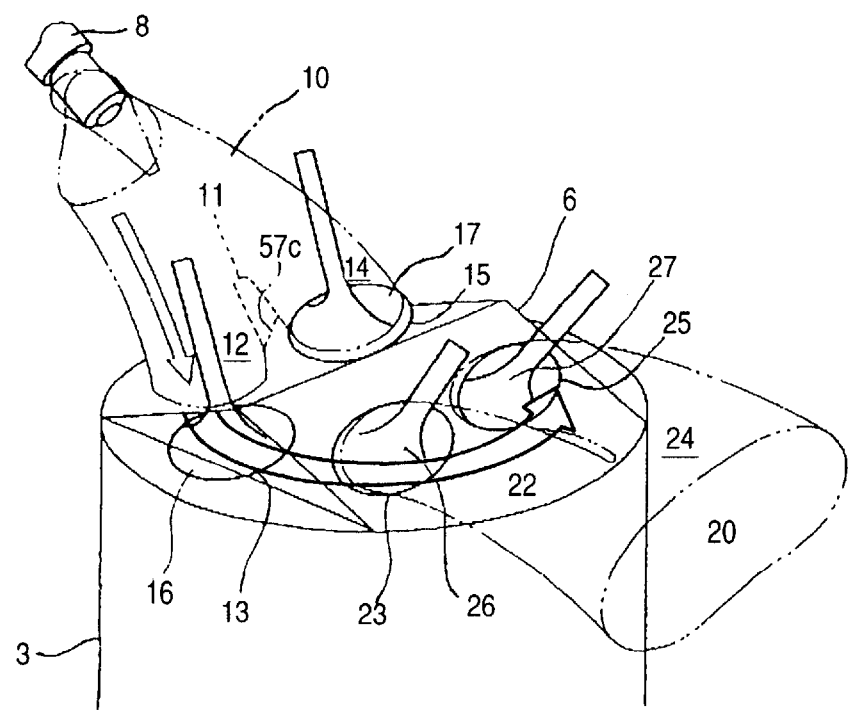
FIG. 3 is a schematic perspective view of a cylinder, a combustion chamber and surroundings thereof.
Figure 4:
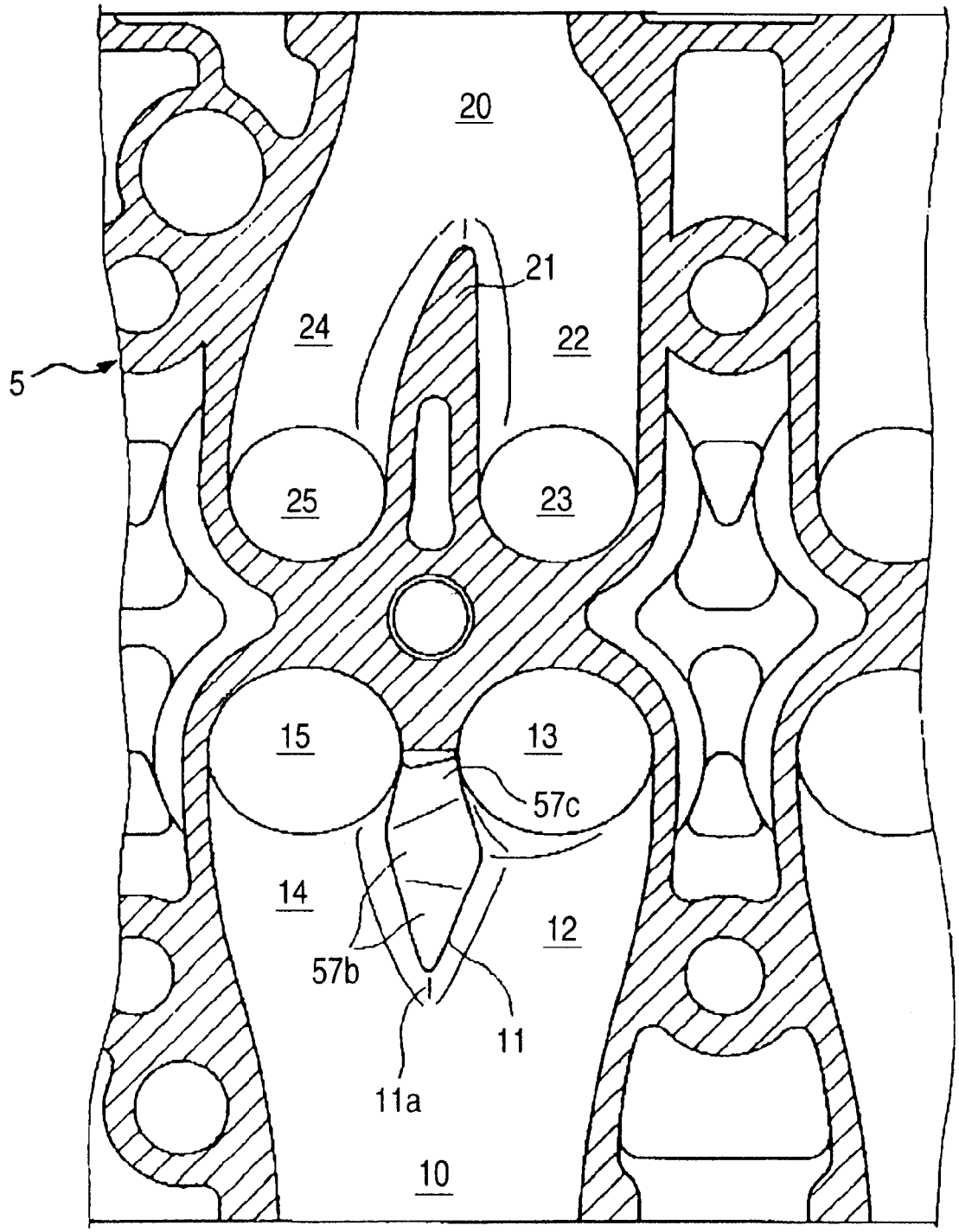
FIG. 4 is a transversal plan view taken along a line IV—IV of FIG. 1.

Thus, in the low intake air operating range in which one of the intake valves, namely, the resting side intake valve 17 rests, most of the intake air flows into the combustion chamber 6 through the intake-valve normally-operating side opening 13 from the intake-valve normally-operating side intake port 12. Moreover, most of the intake air flowing into the intake-valve resting side branch intake port 14 then flows into the intake-valve normally-operating side branch intake port 12 through the cutout 57 provided in the partition wall 11 without causing a backward flow thereof. Furthermore, as illustrated in FIG. 3, this intake air flows from the intake-valve resting side opening 15 side toward the intake-valve resting side branch intake port 14 side, so that a strong swirl, which swirls counterclockwise, is generated.

As a result, most of fuel contained in most of the intake air drawn in the combustion chamber 6 through the intake-valve normally-operating side branch intake port 12 is uniformly dispersed therein, so that the deterioration of the properties of exhaust gas is prevented, especially, the generation of $NO_x$ gas is suppressed.

Further, even when a small amount of intake air drawn into the combustion chamber 6 through the intake-valve resting side branch intake port 14 contains a low concentration of fuel, the fuel is uniformly dispersed therein by a swirl, and thus flows toward the spark plug 7. Thus, in the low intake air operating range, namely, at the time of lean-burn operation, the ignitability of the fuel-air mixture can be maintained at a high level.

Moreover, because of the fact that the cutout 57 is formed in a vertically central portion of the partition wall 11, the deposition of fuel on the surface of the partition wall 11 decreases. The startability of the engine and the properties of exhaust gas thereof can be improved.

Furthermore, as viewed in FIG. 7, the upper surface 57a and the lower surface 57b of the cutout 57 are inclined rightwardly and downwardly to the intake-valve normally-operating side opening 13 so that the upper surface 57a and the lower surface 57b thereof are formed in such a manner as to extend from the upstream side of the common intake port 10 to the intake-valve normally-operating side branch intake port 12 and the intake-valve resting side branch intake port 14. Thus, the intake air flowing through the cutout 57 runs while being twisted clockwise. Consequently, the effects of stirring intake air by the swirl are enhanced still more.

Additionally, because the downstream end surface 57c of the cutout 57 is inclined in such a way as to extend from the intake-valve resting side branch intake port 14 toward the intake-valve normally-operating side branch intake port 12 and to approach the intake-valve normally-operating side opening 13, most of the intake air flowing through the cutout 57 is led to the intake-valve normally-operating side opening 13. Thus, the swirl is enhanced. Moreover, the intake resistance is reduced.

Furthermore, because the intake-valve normally-operating side branch intake port 12 is formed so that the transverse sectional area thereof is less than the transverse sectional area of the intake-valve resting side branch intake port 14, in the low intake air operating range, the intake air passing through the intake-valve normally-operating side branch intake port 12 is accelerated in such a manner as to be extremely faster than the intake air passing through the intake-valve resting side branch intake port 14. Thus, the swirl is enhanced still more.

Further, because the intake-valve normally-operating side branch intake port 12 is formed so that the lateral width thereof is less than the lateral width of the intake-valve resting side branch intake port 14, a swirl of the intake air passing through the intake-valve normally-operating side intake port 12 is enhanced still more.

Next, in the range of a high intake air operation, such as a high speed operation or a high load operation, pressure oil is supplied into the cylinder chamber 36 through the valve timing switchover oil passages 42 and 41. Further, the piston 38 projects and is fitted into the stepped cylinder 37, as illustrated in FIG. 5. The resting side rocker arm 34 and the normally-operating side rocker arm 33 vertically rock in such a way as to be integral with each other. Further, not only the normally-operating side intake valve 16 but the resting side intake valve 17 open and close according to large lift characteristics $L_{1A}$. The intake air flowing into the common intake port 10 runs through each of the intake-valve normally-operating side branch intake port 12 and the intake-valve resting side branch intake port 14 in a similar flowing state. Consequently, a large amount of intake air can smoothly flow into the combustion chamber 6.

In this high intake air operating range, no intake airflow is largely disturbed by the cutout 57 provided in the partition wall 11. The transverse sectional area of each of the intake-valve normally-operating side branch intake port 12 and the intake-valve-continuously resting side branch intake port 14 increases, so that the intake airflow resistance of the intake airflow decreases. Consequently, the maximum output of the engine increases, so that the fuel consumption is improved.

Next, a description will be given of a second embodiment with reference to FIGS. 12 to 15.

Parts or components of the embodiment illustrated in FIGS. 12 to 15, which are common to this embodiment and the embodiment illustrated in FIGS. 1 to 11, are designated by the same reference characters as used for such parts or components in FIGS. 1 to 11.

In the embodiment shown in FIGS. 12 to 15, a groove 58 inclined in such a manner as to extend from the upstream side portion of the intake-valve resting side branch intake port 14 toward the intake-valve normally-operating side branch intake port 12 is formed in the lower surface portion of the cutout 57.

Because the groove 58 is formed in the lower surface portion 57b of the cutout 57 of the embodiment illustrated in FIGS. 12 to 15 as described above, intake air flowing along the bottom surface of the intake-valve resting side branch intake port 14 is smoothly led to the downstream side bottom surface of the intake-valve normally-operating side branch intake port 12 through the groove 58 without running along stepped portions. Then, the intake airflow more smoothly runs from the intake-valve resting side opening 13 to the combustion engine 6. Consequently, a swirl is enhanced still more in the low intake air operating range. Moreover, the generation of $NO_x$ gas and unburnt gas is suppressed. Furthermore, the lean combustibility is enhanced. Consequently, the fuel consumption is reduced.

Figure 16:
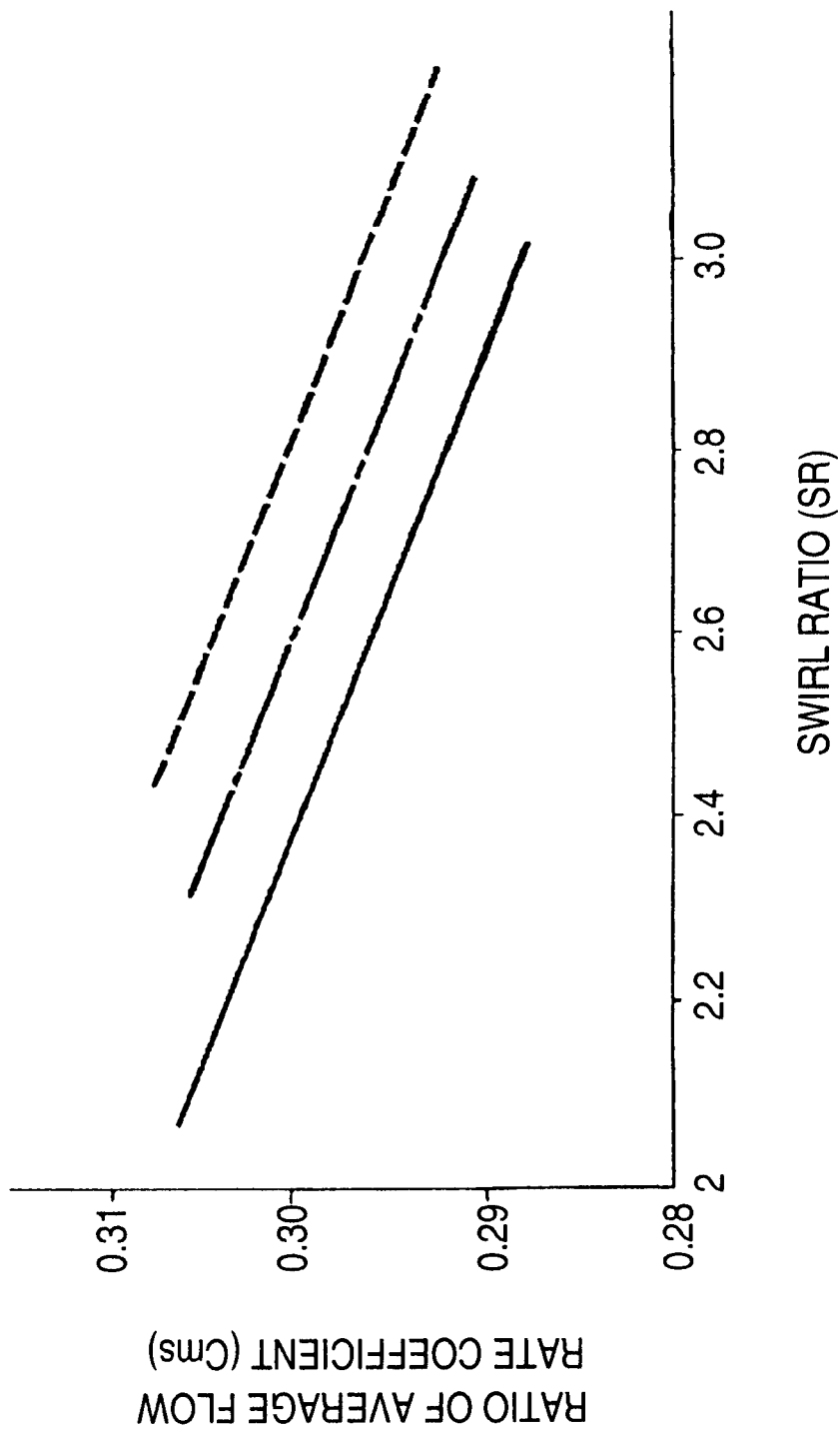
FIG. 16 is a characteristic diagram illustrating the relation in the magnitude between a swirl and an intake airflow resistance by letting the abscissa and the ordinate thereof represent a swirl ratio and an average flow coefficient, respectively.

FIG. 16 is a characteristic diagram illustrating the relation in the magnitude between a swirl and an intake airflow resistance by letting the abscissa and the ordinate thereof represent a swirl ratio and an average flow coefficient, respectively. This diagram shows the characteristic (indicated by a solid line) of a conventional internal combustion engine in which an intake-valve normally-operating side branch intake port and an intake-valve resting side branch intake port are separated from each other, the characteristic (indicated by a one-dot chain line) of the first embodiment of the present invention, and the characteristic (indicated by a dashed line) of the second embodiment of the present invention.

In the case that the ratio of an average flow coefficient, namely, the ratio of an intake flow rate in a state, in which the valve is in a resting condition, to an intake flow rate in a state, in which both the intake valves open and close, is made to be constant, the swirl generated in the conventional internal combustion engine is weakest. The swirl produced in the first embodiment of the present invention is stronger than the swirl generated in the conventional internal combustion engine. The swirl produced in the second embodiment of the present invention is strongest.

Further, as is seen from FIG. 16, in the case that the swirl strength is set in such a way as to be constant, the intake flow rate of the conventional internal combustion engine is at a lowest level. The intake flow rate of the first embodiment of the present invention is at a second highest level. The intake flow rate of the second embodiment of the present invention is at a highest level.

Figure 17:
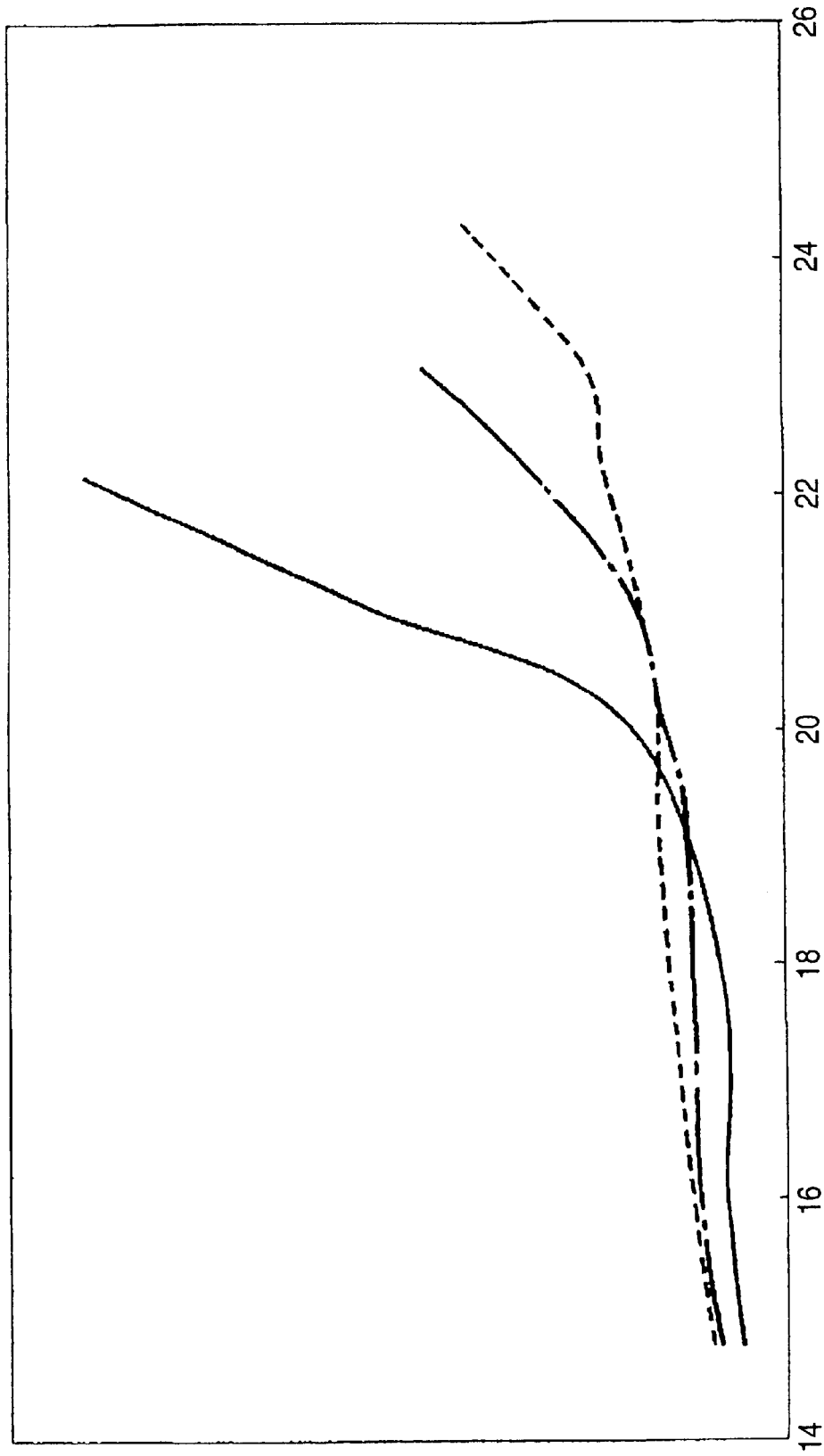
FIG. 17 is a characteristic diagram illustrating how the combustion stability of the engine varies when an air-fuel ratio increases, by letting the abscissa and the ordinate thereof represent the air-fuel ratio and the rate of a combustion variation, respectively.

Further, FIG. 17 is a characteristic diagram illustrating how the combustion stability of the engine varies when an air-fuel ratio increases, by letting the abscissa and the ordinate thereof represent the air-fuel ratio and the rate of a combustion variation, respectively. It is seen from this diagram that the combustion condition (indicated by a solid line) of a conventional internal combustion engine is seriously deteriorated when the air-fuel ratio exceeds 20, that the combustion condition (indicated by a one-dot chain line) of the first embodiment of the present invention is significantly improved, and that the combustion condition (indicated by a dashed line) of the second embodiment is most highly improved.

While only certain embodiments of the invention have been specifically described herein, it will apparent that numerous modifications may be made thereto without departing from the spirit and scope of the invention.

What is claimed is:

1. An intake port structure in a four-stroke cycle internal combustion engine, comprising:

a cylinder head formed with a common intake port, said cylinder head having a partition wall to separate said common intake port into a pair of branch intake ports at a downstream end thereof; and a pair of intake valves independently and respectively opening and closing said pair of branch intake ports, wherein one of said pair of intake valves opens and closes in a low intake air operating range, while the other intake valve is in a resting condition, and both said pair of intake valves open and close in a high intake air operating range, and wherein a cutout extending from an upstream end edge of said partition wall toward a downstream end thereof is formed in a laterally central portion of said partition wall.

2. The intake port structure in a four-stroke cycle internal combustion engine according to claim 1, wherein a downstream end surface of said cutout formed in said partition wall is inclined in a direction in which said downstream end surface thereof approaches an opening of one of said intake valves that normally opens and closes.

3. The intake port structure in a four-stroke cycle internal combustion engine according to claim 1, wherein said cutout defines an upper surface and lower surface at an upstream end edge of said partition wall in a laterally central portion of said partition wall.

4. An intake port structure in a four-stroke cycle internal combustion engine, comprising:

a cylinder head formed with a common intake port, said cylinder head having a partition wall to separate said common intake port into a pair of branch intake ports at a downstream end thereof; and a pair of intake valves independently and respectively opening and closing said pair of branch intake ports, wherein one of said pair of intake valves opens and closes in a low intake air opening range, while the other intake valve is in a resting condition, and both said pair of intake valves open and close in a high intake air operating range, and wherein a cutout extending from an upstream end edge of said partition wall toward a downstream end thereof is formed in a laterally central portion of said partition wall, wherein a groove portion extending from an upstream side of an intake-valve resting side branch intake port to a downstream side of an intake-valve normally-operating side branch port is formed in a curved inner surface portion of said pair of branch intake ports at an intake-valve-opening-side of said cutout provided in said partition wall.

5. The intake port structure in a four-stroke cycle internal combustion engine according to claim 4, wherein a bottom surface of said groove portion smoothly connects with a bottom surface of said intake-valve resting side branch intake port and a downstream bottom surface of said intake-valve normally-operating side branch intake port.

6. An intake port structure in a four-stroke cycle internal combustion engine, comprising:

a cylinder head formed with a common intake port, said cylinder head having a partition wall to separate said common intake port into a pair of branch intake ports at a downstream end thereof; and a pair of intake valves independently and respectively opening and closing said pair of branch intake ports, wherein one of said pair of intake valves opens and closes in a low intake air opening range, while the other intake valve is in a resting condition, and both said pair of intake valves open and close in a high intake air operating range, and wherein a cutout extending from an upstream end edge of said partition wall toward a downstream end thereof is formed in a laterally central portion of said partition wall, wherein a transverse sectional area of said intake-valve normally-operating side branch intake port is set in such a manner as to be smaller than a transverse sectional area of said intake-valve resting side branch intake port.

7. The intake port structure in a four-stroke cycle internal combustion engine according to claim 6, wherein width between one side surface of said partition wall and a side surface of said intake-valve normally-operating side branch intake port, which faces the one side surface of said partition wall, is set in such a manner as to be narrower than width between the other side surface of said partition wall and a side surface of said intake-valve resting side branch intake port, which faces the other side surface of said partition wall.

* * * * *